(12) United States Patent
Steinberg et al.

(10) Patent No.: US 7,995,772 B2
(45) Date of Patent: Aug. 9, 2011

(54) METHOD FOR ASSESSING INTERFERING NOISE

(75) Inventors: Klaus Steinberg, Mauern (DE); Tobias Achten, Krefeld (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 1511 days.

(21) Appl. No.: 11/119,479

(22) Filed: May 2, 2005

(65) Prior Publication Data

US 2005/0249362 A1 Nov. 10, 2005

Related U.S. Application Data

(63) Continuation of application No. PCT/EP03/11800, filed on Oct. 24, 2003.

(30) Foreign Application Priority Data

Oct. 31, 2002 (DE) .................................. 102 50 739

(51) Int. Cl.
*H04B 15/00* (2006.01)
*H04B 1/00* (2006.01)
*H04R 29/00* (2006.01)
*H03G 3/20* (2006.01)

(52) U.S. Cl. .......... 381/94.3; 381/56; 381/57; 381/94.1; 381/86; 381/94.2

(58) Field of Classification Search ................. 381/94.3, 381/57, 56, 71.2, 94.1, 86
See application file for complete search history.

(56) References Cited

U.S. PATENT DOCUMENTS

| 4,387,588 | A | * | 6/1983 | Kaji .............................. 73/35.05 |
| 4,989,252 | A | * | 1/1991 | Nakanishi et al. ............ 381/71.3 |
| 5,526,323 | A | * | 6/1996 | Chapman ....................... 367/135 |
| 5,551,298 | A | | 9/1996 | Rayment |
| 2004/0081322 | A1 | * | 4/2004 | Schliep et al. .................. 381/57 |

FOREIGN PATENT DOCUMENTS

| DE | 33 32 941 A1 | 3/1985 |
| DE | 34 37 661 C2 | 8/1986 |
| DE | 37 41 253 A1 | 6/1989 |
| DE | 197 23 728 C2 | 12/1997 |
| DE | 196 26 329 C2 | 1/1998 |
| DE | 197 36 021 A1 | 2/1999 |
| DE | 197 48 839 C1 | 2/1999 |
| DE | 198 09 059 C2 | 9/1999 |
| DE | 199 24 955 A1 | 12/1999 |
| DE | 198 37 476 A1 | 2/2000 |
| DE | 198 44 784 A1 | 4/2000 |
| DE | 199 35 973 A1 | 1/2001 |
| DE | 199 26 411 C1 | 2/2001 |
| DE | 199 34 724 A1 | 4/2001 |
| DE | 100 64 756 A1 | 7/2002 |
| JP | 10-246689 | 9/1998 |

OTHER PUBLICATIONS

DE 19626329 A1, annotated machine translation.*
DE 10064756 A1, machine translation.*
Translation for DE 19626329 A. Process for Analysis of Sound Events. Jan. 8, 1998.*

* cited by examiner

*Primary Examiner* — Devona E Faulk
(74) *Attorney, Agent, or Firm* — Crowell & Moring LLP

(57) ABSTRACT

The invention relates to a method for assessing interfering noise in motor vehicles, according to which noise occurring during a predefined measuring time is divided into different frequency ranges, the changes in level relative to the background noise are determined within said frequency ranges, and the determined changes in level are evaluated.

11 Claims, 4 Drawing Sheets

Level Variations with Different Averaging Times (Red Curve: Long Time Window, Blue Curve: Very Short Time Window)

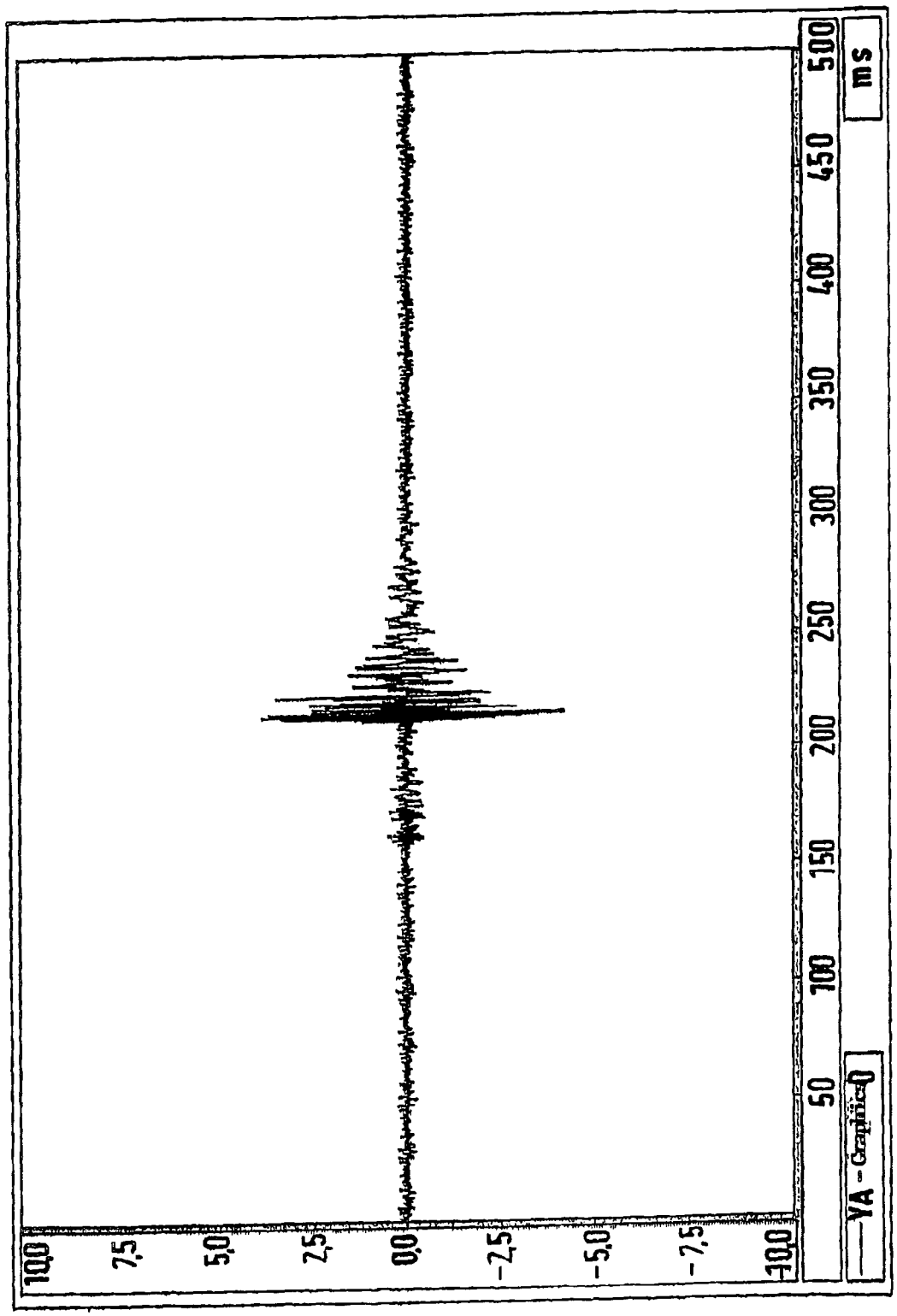

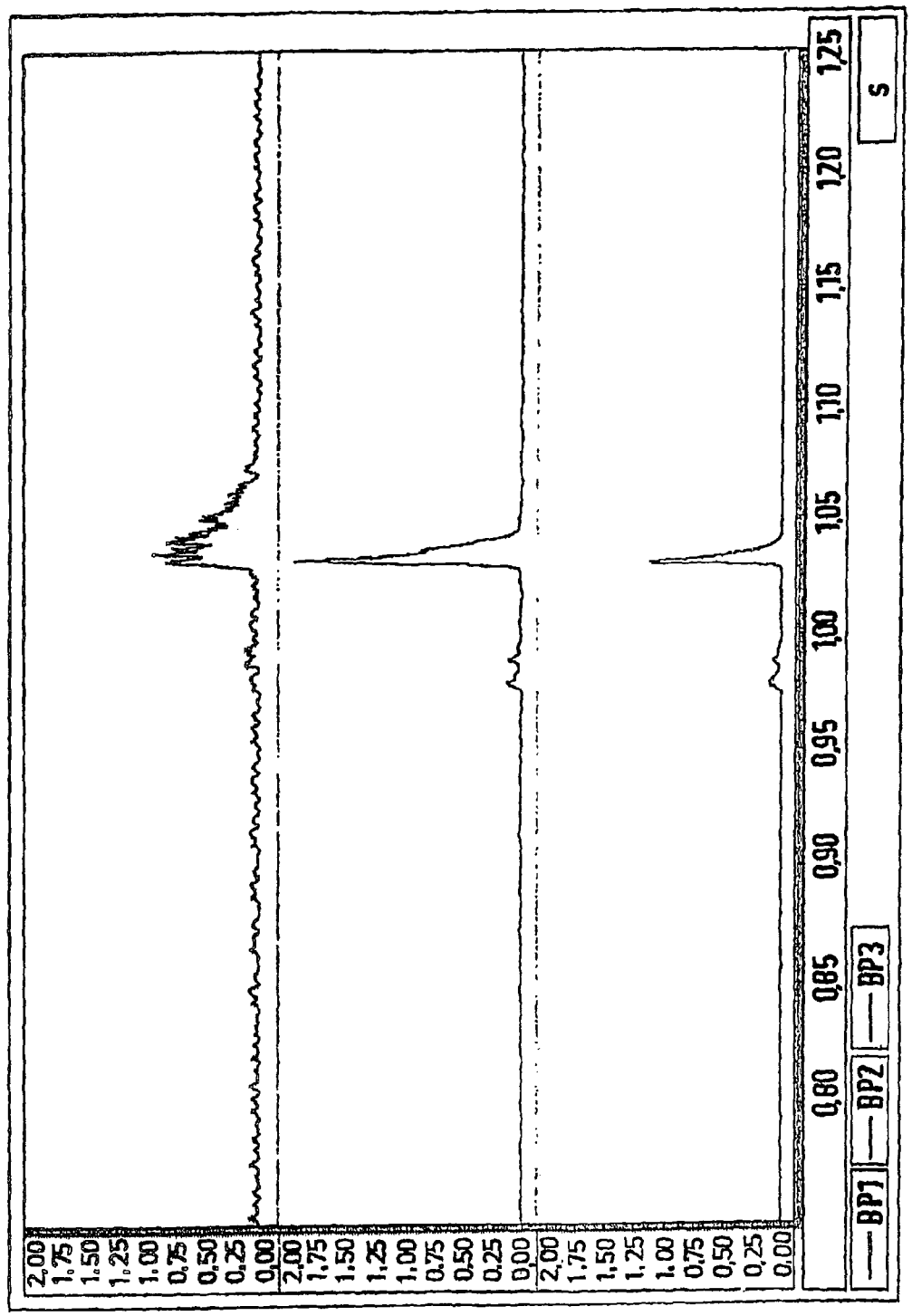
FIG. 2: Decomposition of the Total Noise into 3 Different Frequency Bands (Top: Low-Frequency Fractions, Center: Medium-Frequency Fractions, Bottom: High-Frequency Fractions)

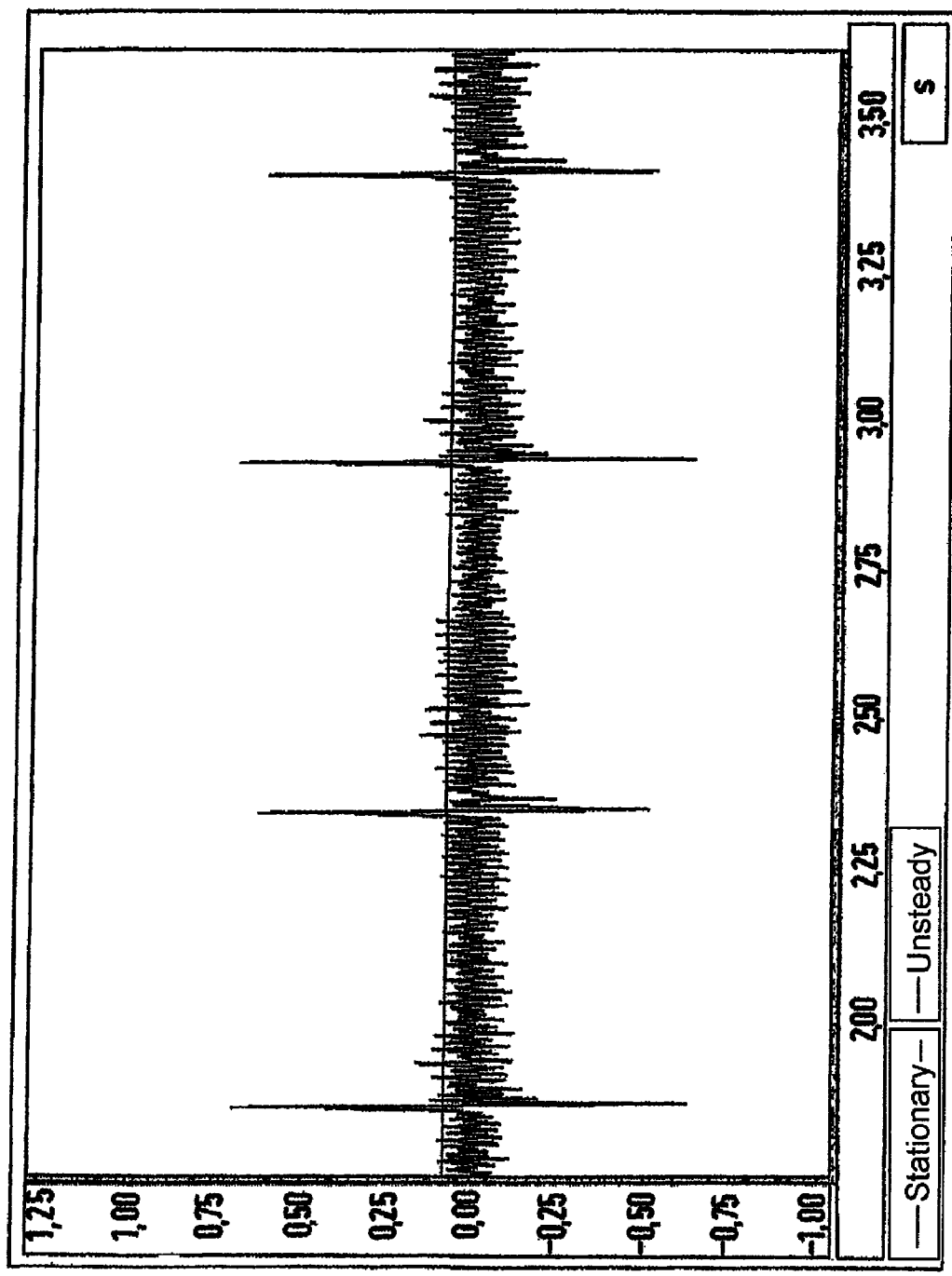
FIG.3: Level Variations with Different Averaging Times (Red Curve: Long Time Window, Blue Curve: Very Short Time Window)

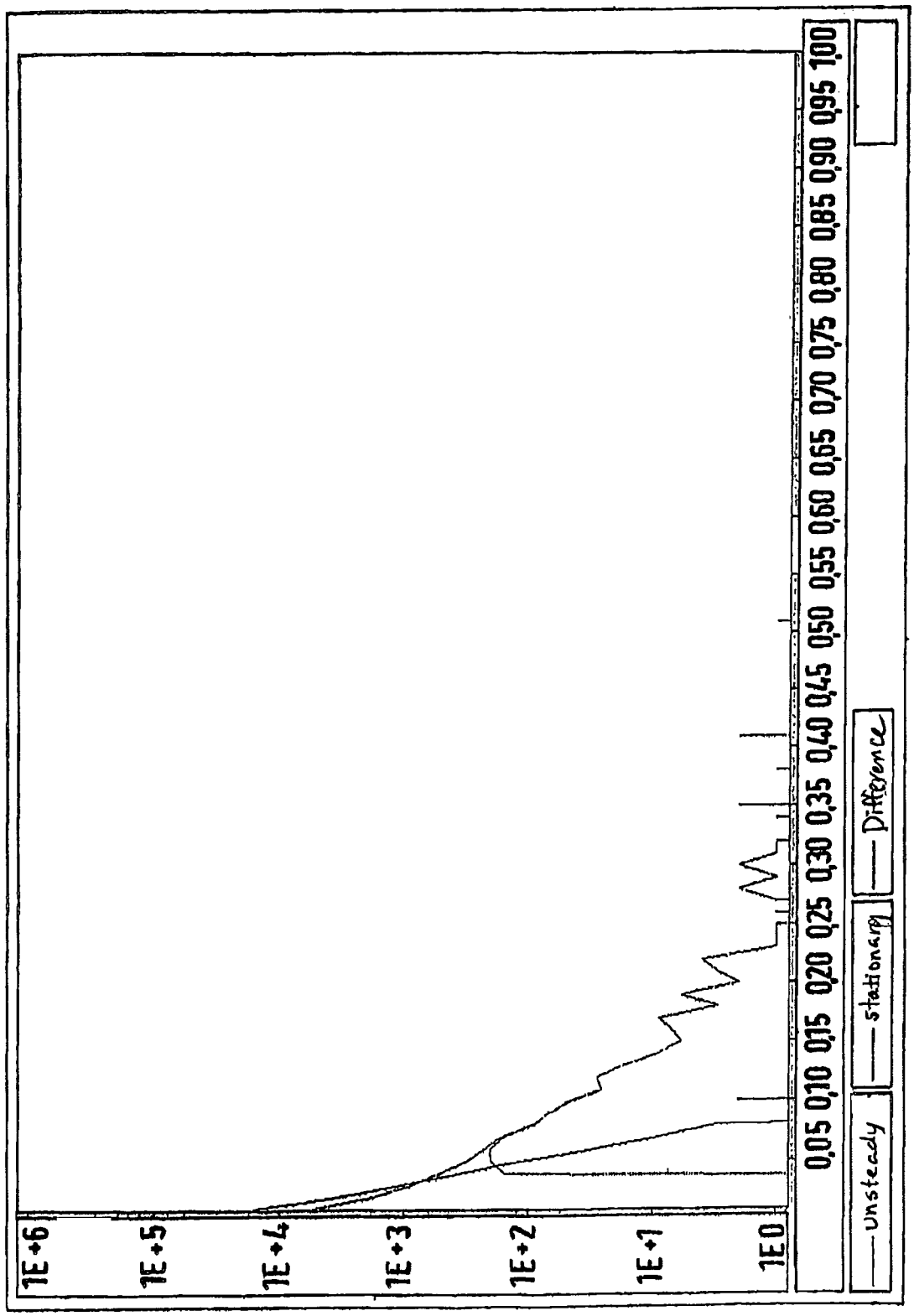
FIG. 4  Level Change Histogram (Blue Curve: Stationary Signal Fraction, Red Curve: Unsteady Signal Fraction, Pink Curve: Difference Curve)

METHOD FOR ASSESSING INTERFERING NOISE

CROSS-REFERENCE TO RELATED APPLICATIONS

This application is a continuation of PCT Application No. PCT/EP2003/011800 filed on Oct. 24, 2003, which claims priority to German Application No. 102 50 739.2 filed Oct. 31, 2002.

BACKGROUND AND SUMMARY OF THE INVENTION

The invention relates to a method of assessing interfering noise in motor vehicles. Noises of this type occur, for example, during a rubbing motion of material surfaces.

In connection with the diagnosis of motor vehicle functions, a method of determining an adhering-sliding motion is known from German Patent document DE 197 23 728 A1. This known method relates essentially to the capability to differentiate between a normal condition and an adhering-sliding of moving working elements, such as control valves.

Furthermore, a method of determining components of a vehicle unit which are in need of repair is known from German Patent document DE 34 37 661 A1. In the case of this method, vehicle units are measured in the new condition with respect to occurring vibrations. Particularly during later maintenance work, the same vehicle unit is measured again with respect to occurring vibrations. The intensities of the vibrations are compared with one another. A disproportionately high increase of the intensity of a vibration is a criterion of the need of a component to be repaired. In this case, comparative measurements can be made only in the case of one and the same vehicle unit. Furthermore, in that case, not all interference noises which may occur in a vehicle unit can be diagnosed.

From German Patent document DE 33 32 941 A1, an overall sound analysis of running machines and systems is generally known, during which the recorded sounds are compared with defined threshold values, In U.S. Pat. No. 5,551,298, various components are caused to vibrate as a result of defined vibration excitations. The recorded vibrations are assessed by means of stored vibrations with respect to their frequency or frequency band in order to identify the source of a noise in the form of a certain component. Here also, only a limited diagnosis of the noise source can be made.

From the Japanese abstract of Japanese Patent document JP 10246689 A, a machine is known by which the rubbing noise of a material can be determined.

Finally, from German Patent document DE 199 26 411 C1, a method is known for determining the cause of interfering noises in motor vehicles. Especially for noises caused by an adhering-sliding movement on material surfaces, this method suggests to store this noise relative to the contact site of the materials.

The previous methods relate to the problem of identifying the cause of interfering noises of different components in the motor vehicle. Different components are diagnosed in different fashions.

It is an object of the invention to provide an improved method of the above-mentioned types in the sense of a standardized systematology.

This object is achieved by providing a method of assessing interfering noises in motor vehicles. The noises occurring during a defined measuring time are divided into different frequency ranges. Within the frequency ranges, the level changes are determined with respect to the background noise. The thus determined level changes are analyzed. Advantageous further developments of the invention are described and claimed herein.

In the case of the method according to the invention for assessing interfering noises, no differentiation is made between the different possibilities of generating noise (for example, an exclusive adhering-sliding motion of material surfaces). To the contrary, the entire noise spectrum-independently of its origin—is examined over the defined measuring time. Advantageously, for this purpose, the signal is stored over the measuring time and is analyzed isochronously.

In contrast to a method for determining a subjectively perceived noise, as known from German Patent document DE 198 44 784 A1, in the case of the invention, there is no leaving of the time domain when analyzing the interfering noises. In contrast, in the case of the known method, a transformation takes place into the frequency range. Apart from the fact that in this case also possibly interfering noise is treated in the same manner and is therefore changed, as a result of the inertia typical of a frequency-dependent analyzing method, such a method is not exactly capable of differentiating between high-frequency interfering noises and the background noise level.

In the case of the invention, the analysis of the interference noises takes place frequency-range-selectively. For this purpose, the noises are divided into various frequency bands. Within the frequency bands, the level changes are defined with respect to the background noise and the thus determined level changes are analyzed.

In order to determine the background noise, the noises are scanned within their frequency range with first time windows and are averaged over the first time window.

In this case, the first time windows for the frequency ranges can mutually have the same duration. As a result, a uniform basis is created, particularly for a joint taking-into-account of the noise events in the different frequency bands.

For determining the unsteady noise fraction within its frequency range, the noises can be scanned with second time windows whose duration is shorter than that of the first time windows. This examination possibility can be conducted at low technical expenditures.

In this case, the second time windows may have a shorter time duration for the range of higher frequencies than for the range of lower frequencies. As a result, the interfering-noise sensitivity of human hearing is taken into account, which differs as a function of the frequency range.

The level change frequency of unsteady noise events is defined from the unsteady noise fraction. The level change will be registered when it exceeds a defined threshold.

In a supplementary fashion, the level change amplitudes of unsteady noise events can be determined from the unsteady noise fraction. The intensity of the interfering noises can thereby be detected.

An overall assessment of the noise and a differentiation between an acceptable and an unacceptable noise behavior can be achieved in a particularly simple manner when a weighted sum of the level change frequencies and of the level change amplitudes is formed over all frequency ranges.

As a result, a method is obtained for assessing interfering noises which supplies objective information concerning interfering noises.

Other objects, advantages and novel features of the present invention will become apparent from the following detailed description of the invention when considered in conjunction with the accompanying drawings.

BRIEF DESCRIPTION OF THE DRAWINGS

FIG. 1 illustrates an exemplary noise signal recorded over a defined measuring time, which signal is decomposed into three frequency bands;

FIG. 2 illustrates each of the three frequency bands of FIG. 1;

FIG. 3 illustrates the signal level curves with different averaging times; and

FIG. 4 is a histogram of the level changes.

DETAILED DESCRIPTION OF THE DRAWINGS

The starting point for the analyzing method according to the invention is the fact that a total noise is composed of a (quasi)stationary background noise (noise, wind, production sounds) and the unsteady interfering noises to be detected. The background noise is frequently exhibited as an offset in a sound level-time variation diagram.

The human ear reacts very sensitively to "changes". However, changes in the overall level (sum over all frequencies) are not sufficient in order to feel that a noise is interfering. On the contrary, a noise is perceived as being interfering when its tonal composition changes. The invention takes this into account in that the tonal composition is detected.

For this purpose, a noise, which is illustrated as an example in FIG. 1 and is recorded over a defined measuring time, is decomposed into different (here, three) frequency bands (low-frequency, medium-frequency and high-frequency fraction).

The three fractions concerning FIG. 1 are illustrated in FIG. 2. The implementation takes place by means of simple high-pass, low-pass and band pass filters (not shown). The three fractions are therefore present as level-time variations in the individual frequency bands.

These variations in the individual frequency bands are examined as follows.

First, the quasistationary background level is determined by averaging over time with a relatively large time constant of 1 s (sliding effective-value formation with a first time window of 1 s, which has the same length for all frequency ranges). Impulsive peaks are smoothed by this averaging and an approximately constant level is achieved.

A second averaging with significantly shorter time windows (depending on the frequency band with a different length of between 0.1 s and 0.005 s) reacts significantly more sensitively to short-term noise pulses and is therefore used for determining the unsteady fraction. This is illustrated in FIG. 3.

The change of the noise level in the different frequency bands is now examined. In this case, the change is defined as the level difference between the points in time T and Tmittel (Tmean), Tmittel being the respective averaging time. This level change is perceived differently by the human hearing at different frequencies.

An examination is aimed at the relationship of the level change typical of an unsteady noise, which is perceived as being disturbing, to the constant background noise. If it is very low (strong background noise), small changes are not perceived, while the same changes are well perceived in the case of a slight background noise. The ratio between the level change and the constant background level is therefore defined. If this ratio is greater than a threshold value x, the noise becomes audible. This is used as the decision criterion between stationary and unsteady and throws a type of "switch". Time domains in which noises become audible (unsteady time domains) are thereby separated from domains in which the noise is perceived as a "constant" environmental/background noise.

In addition to perceiving the (interfering) noises as such, the question of how interfering are the noises is also examined. A classification is carried out for this purpose. It is examined how often and at which "loudness level" these changes are occurring. For this purpose, the total of the level changes to be expected is divided in X (for example, X=100) classes of 0 (constant) to MAXimal, and it is counted how often level changes fall into the respective class. A histogram is obtained (x-axis: level change; y-axis: frequency). This is illustrated in FIG. 4.

The essential characteristics of the method according to the invention will be summarized again in the following.

Erratic amplitude changes are to be detected in each frequency band. When the low-frequency signal fraction is now considered, the average value changes there, that is, the quasistationary background level, because of the exclusively lower frequency fractions, as a rule, changes more slowly than, for example, in the frequency bands for the medium frequency or high-frequency signal fraction. The time windows for the smoothing of the stationary signal fraction (is in all three frequency bands) are completely independent thereof.

The unsteady level, however, is computed by way of a sliding effective value with different time windows. The time interval in which the change of the amplitude is considered is adapted to the "rise duration" (rising edge) of typical impulsive interfering noises. Its time duration, in turn, depends on the frequency band and amounts to, for example, 0.1 s in the case of the low-frequency band and 0.005 s in the case of the high-frequency band.

Irrespective of whether only a few individual interfering noises or a large number of interfering noises occur in the observed time domain (1 s), these are detected because of their level change typical of an interfering noise and are not included in the formation of the quasistationary average value (=background noise) On the contrary, they always relate to the same unchanged quasistationary average value and in this respect are detected with their unchanged amplitude. It therefore becomes possible to rapidly and unambiguously detect interfering noises.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assessing interfering noise in motor vehicles, the method comprising the acts of:
   dividing the noise occurring during a predefined measuring time into different frequency ranges comprising at least a low-frequency range, a medium-frequency range and a high-frequency range;
   within each of the frequency ranges, determining changes in noise level relative to a background noise; and
   evaluating the determined changes in noise level to assess the interfering noise,
   wherein for determining the background noise, the method further comprises the acts of:
   scanning the noise within their frequency range with first time windows; and averaging the noise over the first time window, wherein for determining an unsteady noise fraction, the noises are scanned within their frequency range with second time windows having a duration shorter than that of the first time windows, and wherein the second time windows for higher frequency ranges have a shorter time duration than for lower frequency ranges.

2. The method according to claim 1, wherein the first time windows for the frequency ranges are of a mutually equally long duration.

3. The method according to claim 1, wherein the act of evaluating further comprises the act of evaluating the level changes with respect to a frequency with which unsteady noise events occur within an unsteady noise fraction.

4. The method according to claim 2, wherein the act of evaluating further comprises the act of evaluating the level changes with respect to a frequency with which unsteady noise events occur within an unsteady noise fraction.

5. The method according to claim 1, wherein the level changes are further analyzed with respect to amplitudes with which the unsteady noise events occur within the unsteady noise fraction.

6. The method according to claim 2, wherein the level changes are further analyzed with respect to amplitudes with which the unsteady noise events occur within the unsteady noise fraction.

7. The method according to claim 3, wherein the level changes are further analyzed with respect to amplitudes with which the unsteady noise events occur within the unsteady noise fraction.

8. The method according to claim 1, further comprising the act of determining a weighted sum of the level change frequencies and the level change amplitudes over all frequency ranges.

9. The method according to claim 2, further comprising the act of determining a weighted sum of the level change frequencies and the level change amplitudes over all frequency ranges.

10. The method according to claim 3, further comprising the act of determining a weighted sum of the level change frequencies and the level change amplitudes over all frequency ranges.

11. The method according to claim 5, further comprising the act of determining a weighted sum of the level change frequencies and the level change amplitudes over all frequency ranges.

* * * * *